United States Patent [19]

Boehmer et al.

[11] Patent Number: 4,702,386
[45] Date of Patent: Oct. 27, 1987

[54] FUEL FILLER PIPE SEAL

[75] Inventors: Dennis A. Boehmer; Dale R. Piper, both of Xenia, Ohio

[73] Assignee: Vernay Laboratories, Inc., Yellow Springs, Ohio

[21] Appl. No.: 871,357

[22] Filed: Jun. 6, 1986

[51] Int. Cl.[4] .............................................. B67D 5/04
[52] U.S. Cl. .................. 220/86 R; 141/285; 220/85 F
[58] Field of Search ................. 16/2, 108, 109; 141/5, 141/285, 286, 290, 301, 311 R, 314, 350, 389; 220/1 V, 85 F, 85 VR, 85 VS, 86 R, DIG. 33; 285/231, 233, 234

[56] References Cited

U.S. PATENT DOCUMENTS

| | | | |
|---|---|---|---|
| 1,697,814 | 1/1929 | Forbes | 16/2 X |
| 1,873,592 | 8/1932 | James | 285/231 |
| 2,897,533 | 8/1959 | Bull et al. | 16/2 |
| 3,903,942 | 9/1975 | Vest | 141/314 X |
| 4,323,166 | 4/1982 | Maeroff | 16/2 X |

Primary Examiner—Henry J. Recla
Assistant Examiner—Mark Thronson
Attorney, Agent, or Firm—Biebel, French & Nauman

[57] ABSTRACT

A fuel filler pipe seal includes upper and lower portions and a sealing lip positioned at the juncture of the upper and lower portions to engage an outer surface of a fuel nozzle and prevent the escape into the atmosphere of fuel fumes during a fueling operation. The lip lies in a plane which intersects a groove formed in an outer surface of the seal to receive a seat formed on a mounting bracket mounted in an upper end of the filler pipe, and the upper portion of the seal has an umbrella valve formed integrally with it which covers a vent opening in the bracket and is preloaded to release at a predetermined pressure. By positioning the sealing lip adjacent the seat-receiving groove a better seal with a fuel nozzle is formed, premature release of the umbrella valve is avoided, and damage to the seal when the nozzle is thrust into the filler pipe is minimized.

7 Claims, 6 Drawing Figures

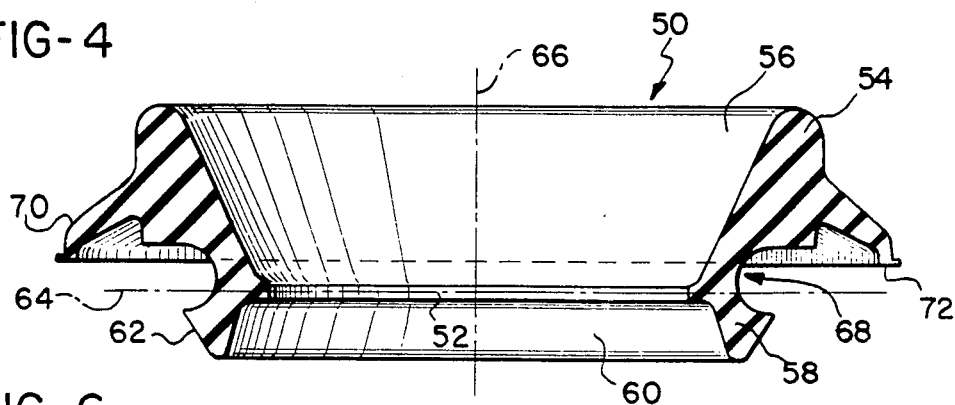
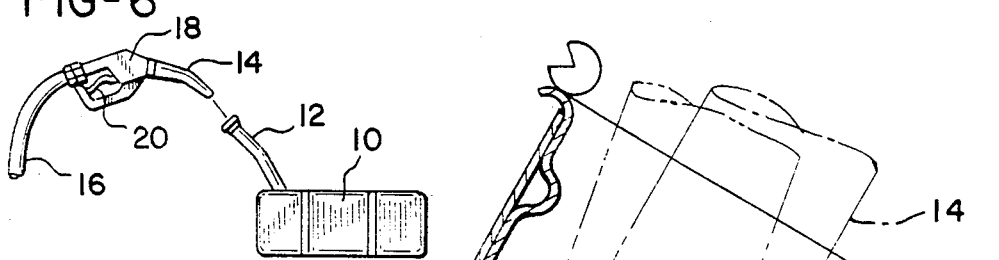
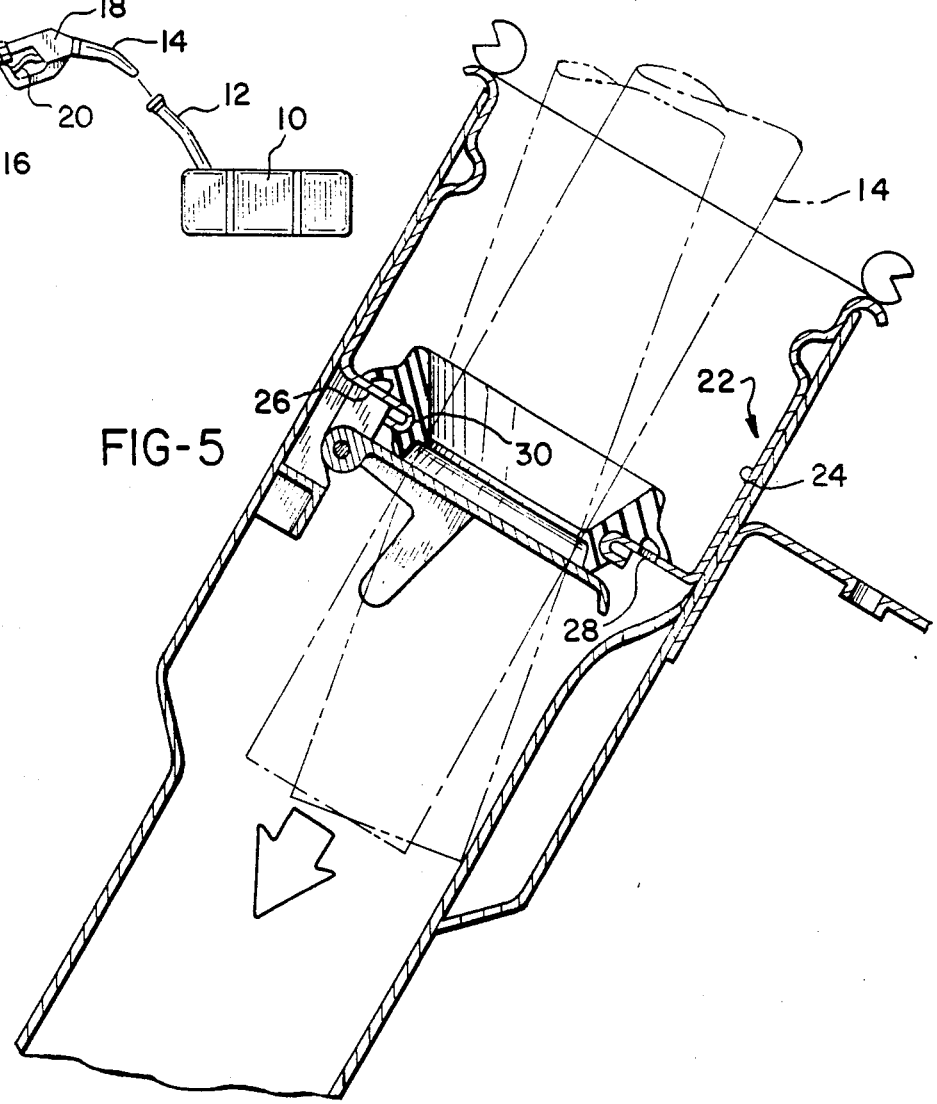

FUEL FILLER PIPE SEAL

BACKGROUND OF THE INVENTION

In refueling a vehicle a fuel nozzle is inserted into a filler pipe leading to the fuel tank for the vehicle and fuel under pressure is discharged through the nozzle into the filler pipe, with fuel flow controlled by a suitable valve, often manually controlled. Thus, in refueling an automobile or other vehicle with, for example, gasoline, a fuel nozzle is inserted into the vehicle filler pipe and gasoline is discharged through the nozzle and into the fuel tank communicating with the filler pipe, while the operator either holds a valve manually open, or quite frequently utilizes an automatic shutoff device for terminating fuel flow as the fuel tank reaches a full configuration.

Typically in such operations, since the fuel is usually extremely volatile, a portion will evaporate and the resulting fumes escape into the atmosphere through the space between the exterior surface of the fuel nozzle and the interior surface of the filler pipe. To avoid the resultant pollution certain remedies have been proposed.

For example, U.S. Pat. No. 3,903,942 discloses a vapor seal for a fuel tank filler tube in which a so called "adapter member" is mounted in an upper end of the filler tube and constructed of an resilient, fuel resistant material, such as Neoprene, Nitrile, Viton, Buna N, or similar material. The adapter member has a constricted opening at its inner end, so that as the fuel nozzle is inserted into the filler tube the constricted lower end of the adapter member engages the outer surface of the fuel nozzle to seal the space that would normally exist between the fuel nozzle and the filler pipe.

It would appear that with this construction substantial stretching of the adapter member is required each time the fuel nozzle is inserted, which may lead to premature material fatigue, and that the adapter member can be easily sheared at the point it is attached to the filler tube if, as the fuel nozzle is inserted, it strikes the adapter member at that point.

Another proposal to obviate the problem of vapor escape during refueling consists of a resilient member formed of rubber or similar, fuel resistant material, seated on a mounting bracket attached to the upper end of a filler pipe of a vehicle. This device also includes an umbrella valve portion which normally closes a vent hole formed in the mounting bracket, but permits venting when some predetermined pressure is exceeded.

The seal with the outside of the fuel nozzle is effected by a constricted lower end of the device, generally similar to the manner in which the adapter member described above functions. While this latter device does include an umbrella valve section to permit venting, because the nozzle engaging portion is positioned on the lower end of the device, as the fuel nozzle is rocked into positions other than perfectly concentric with the filler pipe, the preloading of the umbrella valve will be reduced substantially, permitting premature venting, or in extreme cases, unseating of the umbrella valve.

Additionally, because the sealing portion of the device is positioned downstream of an annular groove formed in the exterior surface of the device to receive a seat formed on the seal mounting bracket, the device is particularly susceptible to shearing damage in the vicinity of the groove as the device is struck by the leading end of the fuel nozzle when it is thrust into the filler pipe.

SUMMARY OF THE INVENTION

The present invention provides a fuel filler pipe seal which prevents the escape of the fuel fumes into the atmosphere under normal refueling conditions, but provides a venting capability while obviating the disadvantages of prior art devices of this general type.

Specifically, the present invention provides a fuel filler pipe seal formed of a resilient, fuel-resistant material, such as specially compounded rubber or similar material, and which includes a fuel nozzle-engaging lip positioned intermediate the upper and lower ends of the seal and received on a mounting bracket attached to the upper end of the filler pipe.

The seal has formed integrally with it an umbrella type valve which normally closes one or more vent openings formed in the mounting bracket and which is preloaded to release when a certain predetermined pressure, typically one-half psi, is exceeded. However, because of the position of the sealing lip intermediate the upper and lower portions of the seal, rocking movement of the fuel nozzle while inserted in the filler pipe does not appreciably affect the preloading of the umbrella valve, since the lip serves as the fulcrum of the rocking movement of the nozzle.

Additionally, with this construction there is less likelihood of contact between the lip and the exterior surface of the nozzle being broken as the nozzle is rocked to positions other than one perfectly concentric with the filler pipe.

It will also be seen that with the construction of the present invention a substantial thickness of material is provided at the point where an annular groove is formed in the exterior surface of the seal to receive a seat on the mounting bracket, thereby diminishing the likelihood of shearing damage occuring to the seal as it is struck by the leading edge of a fuel nozzle being inserted into the filler pipe.

These and other advantages and features of the invention will become more apparent from the following detailed description.

BRIEF DESCRIPTION OF THE DRAWINGS

FIG. 4 is a cross-sectional view through the filler tube seal of the present invention;

FIG. 5 is a view of the seal of the present invention mounted in a vehicle filler pipe; and FIG. 6 is a somewhat schematic representation of a vehicle fuel tank and attached filler tube, together with a typical fuel nozzle and associated components.

DETAILED DESCRIPTION

Figure 1:
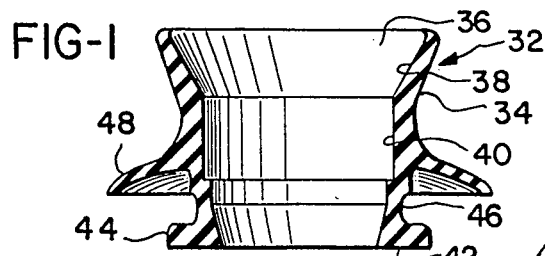
FIG. 1 is a cross-sectional view through a filler pipe seal of the prior art.

Turning initially to FIG. 6 of the drawings, it will be seen that in a typical vehicle fuel system a closed fuel tank 10 connected through means not shown to the engine of the vehicle, will be provided with a filler tube or pipe 12, adapted to be entered by a fuel nozzle 14, connected to a source of fuel under pressure, not shown, through a manually operated valve 18, controlled by a manually engaged handle 20.

Figure 2:
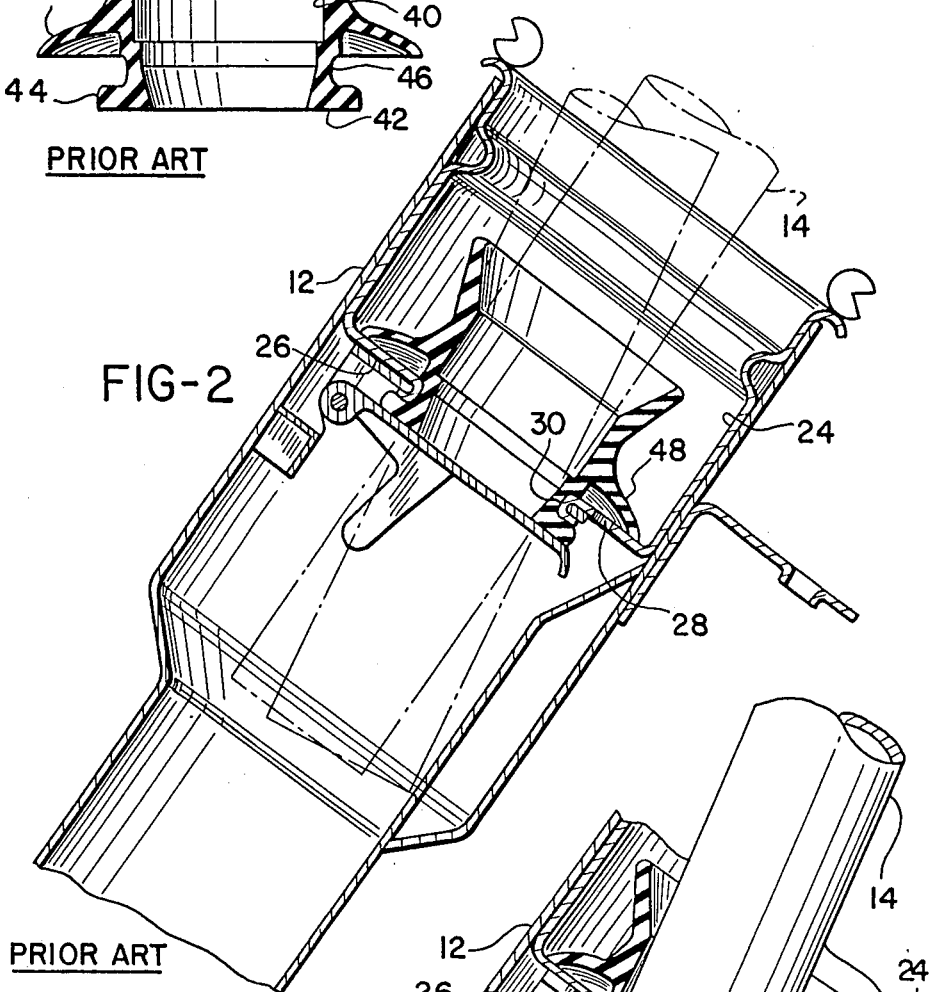
FIG. 2 is a view of the seal of FIG. 1 mounted in a vehicle filler pipe.

In accordance with the prior art, a seal between the filler pipe and the fuel nozzle may be effected in the manner shown in FIGS. 1 and 2. Thus, a mounting bracket 22 is fixed in an upper end of the filler pipe 12 and includes a cylindrical upper portion 24, an annular, radially inwardly extending flange 26, having at least one vent opening 28 formed through it, and a reversely bent portion at its inner end defining a seal mounting seat 30.

The seal 32 includes an upper portion 34 consisting of a stepped inner surface 36 comprised of a first inwardly tapered portion 38 and a second essentially straight sided portion 40. A lower portion 42 of the seal tapers inwardly to engage frictionally the exterior surface of a fuel nozzle, and includes an outwardly projecting section 44, defining a seat-receiving groove 46 just beneath an umbrella type valve 48.

Figure 3:
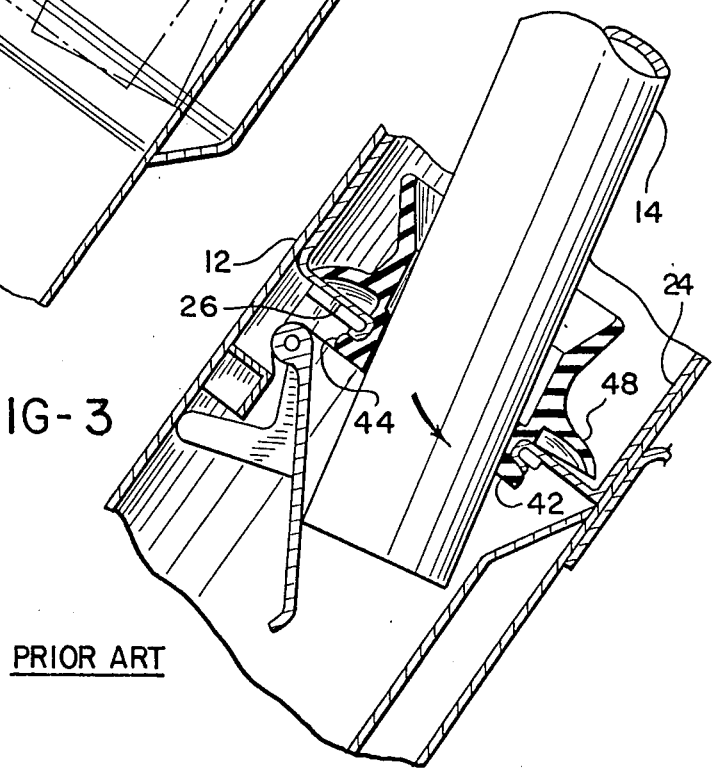
FIG. 3 shows the prior art seal as it is flexed by movement of a fuel nozzle.

As will be apparent from FIG. 3, with this construction it will be seen that the preloading of the umbrella valve 48 may be substantially diminished as a fuel nozzle is rocked about the fulcrum formed by the seat 30 and overlying seal material, and in extreme cases, the edge of the umbrella valve may be completely lifted from contact with the flange 26 of the mounting bracket 24.

Additionally, when the fuel nozzle is thrust into the filler pipe its leading edge may often strike the seal at the point where it overlies the seat 30, a point on the seal of relatively reduced thickness, which increases the likelihood of shearing damage to the seat at that point.

It will also be apparent that, again as the fuel nozzle is rocked to displaced positions from a concentric position within the filler pipe as shown in FIG. 3, a gap may be formed between the exterior surface of the fuel nozzle and the constricted lower end of the seal, allowing the escape of atmosphere-polluting fuel fumes.

In contrast, with the fuel filler pipe seal of the present invention these disadvantages and the disadvantages of other prior art structure as noted above are obviated.

Turning to FIG. 4 of the drawings, it will be seen that the seal 50 of the present invention includes an annular, fuel nozzle engaging lip 52 formed on an inner surface of the seal and adapted to engage an exterior surface of a fuel nozzle. The seal also includes an upper portion 54 having an uninterrupted inner surface 56 flaring upwardly and outwardly, and a lower portion 58 having a downwardly and outwardly flared inner surface 60 and an outer surface 62 converging downwardly to the inner surface.

It will be noted that the lip 52 is positioned substantially at the juncture of the inner surfaces of the upper and lower portions and in a plane 64 disposed normally to the longitudinal axis 66 of the seal, and that the plane 64 intersects an annular groove 68 in the outer surface of the seal.

As seen in FIG. 5, when the seal 50 is mounted on a bracket 22 attached to the upper end of the fuel filler pipe 12 and having a cylindrical portion 24 a flange portion 26 with a vent opening 28 and a seat 30, the groove 68 receives the seat 30 and positions the sealing lip such that it substantially overlies the mounting seat. It will also be seen from FIGS. 4 and 5 of the drawings that the seal includes an umbrella valve portion 70, molded integrally with the seal and having a peripheral edge 72 to engage the flange 26 outwardly of the vent opening 28.

With this construction, since the sealing lip is positioned approximately at the fulcrum point for a nozzle being rocked about within the filler pipe, as indicated in phantom lines in FIG. 5, there will be no appreciable loss of preloading of the umbrella valve portion 70 of the seal, nor will the continuous engagement of the lip 52 with the exterior of the nozzle be broken. Additionally, by positioning the lip 52 essentially over the mounting seat 30, even if the leading edge of the nozzle strikes the seal at this point, the likelihood of the seal shearing is substantially diminished relative to seals of the prior art.

Thus, in accordance with the present invention an improved fuel filler pipe seal is provided which substantially diminishes the likelihood of premature venting around the umbrella valve portion of the seal and shearing damage to the seal, while maintaining a continuous sealing contact between the seal lip and the exterior surface of a fuel nozzle.

While the article herein described constitutes a preferred embodiment of the invention, it is to be understood that the invention is not limited to this precise article, and that changes may be made therein without departing from the scope of the invention which is defined in the appended claims.

What is claimed is:

1. In combination with a fuel filler pipe having an upper end and a seal mounting bracket attached to said upper end of said pipe, said bracket including an annular, radially inwardly projecting flange having an inner end and vent means formed therein and terminating in a seat at said inner end and a seal having a longitudinal axis and including a fuel nozzle engaging portion formed on an inner surface of said seal, an integrally formed umbrella valve overlying said vent means, and means defining an annular groove in an outer surface of said seal and receiving said seat therein, the improvement comprising:

said fuel nozzle engaging portion comprises an inwardly projecting lip positioned intermediate upper and lower ends of said seal, and said lip lies substantially in a plane normal to said longitudinal axis of said seal and intersecting said groove.

said seal having an upper portion having an uninterrupted inner surface flaring upwardly and outwardly and a lower portion having a downwardly and outwardly flared inner surface joined to said inner surface of said upper portion and an outer surface converging downwardly to said inner surface.

2. The combination of claim 1 wherein said lip is formed substantially at a juncture of said upper and lower portions.

3. The combination of claim 1 wherein said seal includes upper and lower portions and said lower portion has inner and outer surfaces converging away from said upper portion.

4. The combination of claim 1 wherein said lip is formed at a juncture of said upper and lower portions.

5. The combination of claim 4 wherein said inner and outer surfaces of said lower portion converge away from said upper portion.

6. The combination of claim 4 wherein said upper portion includes an uninterrupted inner surface tapering inwardly and downwardly to said lip.

7. In combination with a fuel filler pipe having an upper end and a seal mounting bracket fixed in said upper end of said pipe, said bracket including a cylindrical upper portion received within said upper end of said pipe, an annular, radially inwardly extending flange, a vent hole formed through said flange and a reversely bent portion at an inner edge of said flange defining a seal mounting seat, and a seal having a longitudinal axis and an annular, fuel nozzle engaging portion formed on an inner surface thereof, an umbrella valve formed integrally with said seal and terminating in an annular edge engaging an upper surface of said flange outwardly of said vent hole, and means fining an annular groove in an outer surface of said seal and receiving said seat therein, the improvement comprising:

said seal having an upper portion having an uninterrupted inner surface flaring upwardly and outwardly and a lower portion having a downwardly and outwardly flared inner surface joined to said inner surface of said upper portion and an outer surface converging downwardly to said inner surface, said fuel nozzle engaging portion comprises an annular, inwardly projecting lip positioned substantially at a juncture of said inner surfaces of said upper and lower portions and in a plane disposed normally to said longitudinal axis of said seal, and said plane in which said lip substantially lies intersects said annular groove.

* * * * *